UNITED STATES PATENT OFFICE.

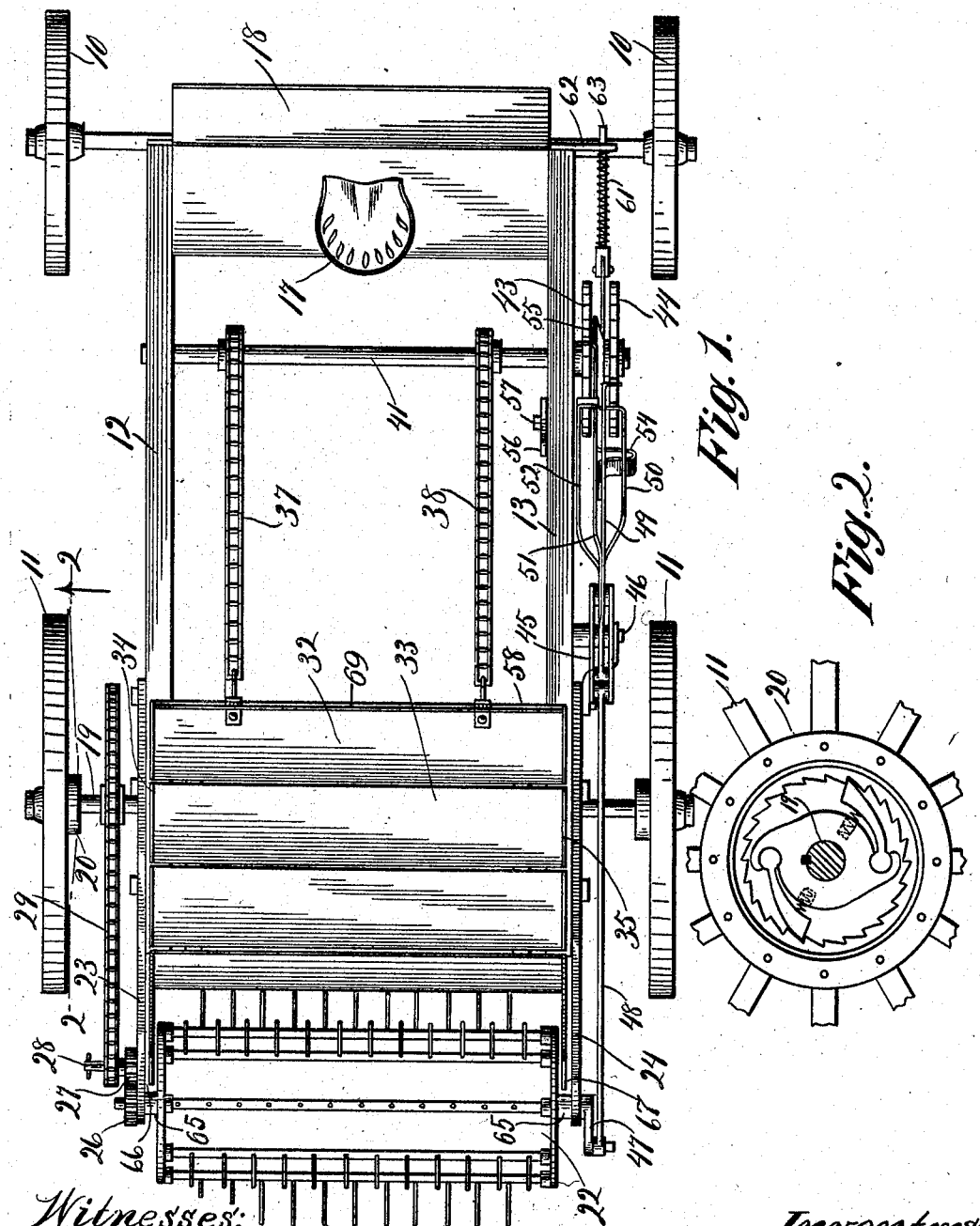

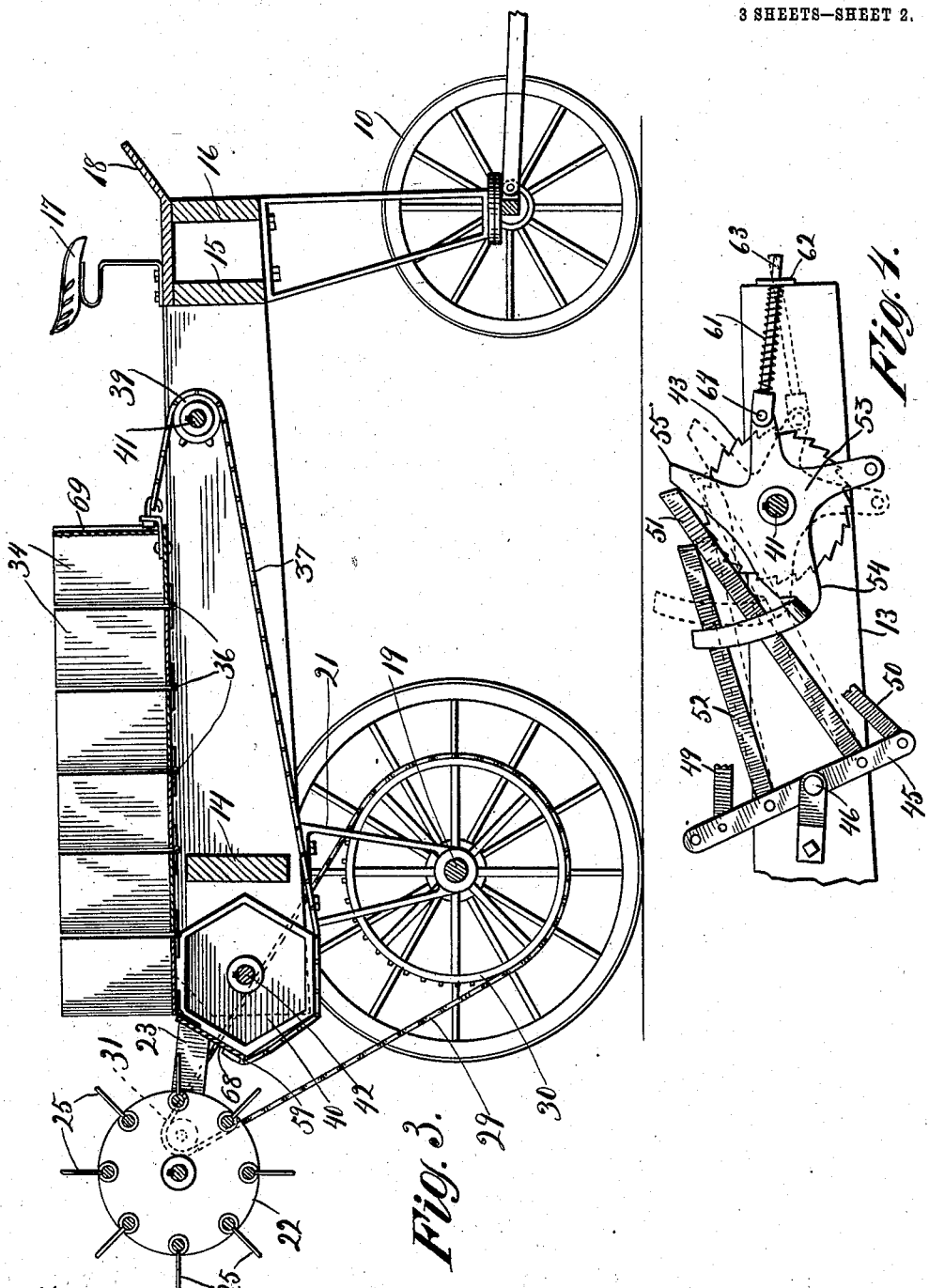

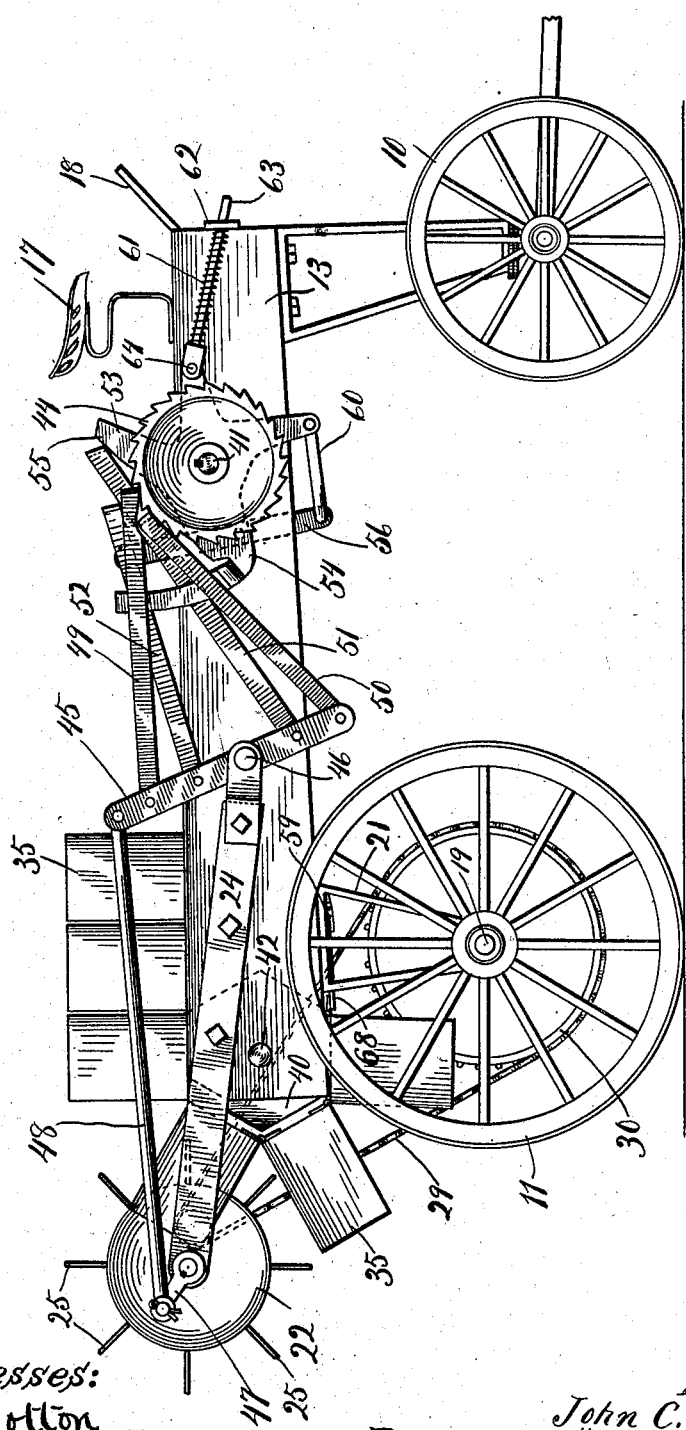

JOHN C. POPE AND WILLIAM J. POPE, OF PLANO, ILLINOIS.

FERTILIZER-DISTRIBUTER.

No. 901,123.      Specification of Letters Patent.      Patented Oct. 13, 1908.

Application filed April 6, 1908. Serial No. 425,488.

*To all whom it may concern:*

Be it known that we, JOHN C. POPE and WILLIAM J. POPE, citizens of the United States, and residents of Plano, county of Kendall, and State of Illinois, have invented certain new and useful Improvements in Fertilizer-Distributers, of which the following is a specification, and which are illustrated in the accompanying drawings, forming a part thereof.

The invention relates to fertilizer distributers and more particularly to improvements in that type of fertilizer distributers which take the general form of an ordinary farm wagon adapted to be drawn over the ground to be treated and having adjacent one end suitable distributing mechanism with means for gradually and uniformly delivering successive portions of the load to the distributing mechanism.

In fertilizer distributers of this type it has heretofore been the practice to employ a hopper for containing the load generally similar to an ordinary wagon box and to employ as a bottom of the hopper a movable apron for gradually delivering the load to disintegrating and distributing mechanism located adjacent the rear end of the wagon box. This practice has been objectionable for the friction between the load and the stationary sides of the wagon box as the former is moved toward the distributing mechanism is excessive and as the movement of the parts is derived from the carrying wheels of the wagon this friction greatly increases the force required to draw the device over the ground. A further objection to this practice resides in the fact that the whole of the load is moved backwardly through the wagon box largely by pressure exerted by a follower board upon the forward part of the load, the follower board being ordinarily mounted at the forward end of the movable apron and carried with the apron during its backward movement. That part of the load which is located adjacent the follower board thereby becomes very much compacted by the time it reaches the distributing mechanism and the draft of the vehicle having by this time been very much reduced by the discharge of the greater portion of the load, there is not sufficient power to effect a disintegration of this compacted portion of the load by the distributer and a sliding of the carrying wheels of the vehicle over the ground without movement of any of the parts of the device results.

The object of the invention is to provide improved means for delivering the load of a fertilizer distributer to the distributing mechanism thereof and the invention contemplates a fertilizer distributer having a sectional hopper and improved means for moving the hopper whereby both the sides and bottom of the hopper are gradually moved with the load.

In the accompanying drawings:—Figure 1 is a plan view of a fertilizer distributer embodying the features of the invention, Fig. 2 is a sectional view of the same taken on the line 2—2 of Fig. 1, Fig. 3 is a central longitudinal sectional view of the same, Fig. 4 is a detail side elevation of the same, showing the mechanism provided for moving the hopper, some of the parts being broken away and others being removed, and Fig. 5 is a side elevation of the fertilizer distributer.

As shown in the drawings the device takes the general form of an ordinary farm wagon having front and rear carrying wheels designated 10 and 11 respectively. The frame of the wagon comprises the side sills 12, 13, and a plurality of transverse members as 14, 15 and 16 uniting the side sills 12 and 13. Preferably the transverse members 15 and 16 are located adjacent the forward end of the wagon and serve to support the forward running gear including the front carrying wheels 10 and a driver's seat and foot board 17, 18.

The rear carrying wheels 11 are mounted upon the ends of a rotating axle 19 to which each is connected by a ratchet hub mechanism 20 (of ordinary construction and shown in detail in Fig. 2 of the drawings) whereby the axle is turned during the forward movement of the wagon over the ground. The axle 19 is journaled adjacent each end in brackets as 21 depending from each of the side sills 12 and 13.

The distributing mechanism provided preferably takes the form of a drum 22 mounted for rotation at the rear end of the wagon in brackets 23, 24 extending backwardly from the side sills 12, 13 and having the usual radially directed tines 25. For turning the drum 22 a gear pinion 26 is fixed upon the spindle thereof adjacent one of its ends and this gear pinion meshes with a second pinion 27 which turns loosely on a stub shaft 28 projecting from one of the brackets as 23 provided for supporting the drum. A sprocket chain 29 which as shown turns over a suitable sprocket wheel 30 mounted on the rear axle 19 of the device and a sprocket pinion 31 formed integrally with the gear pinion 27, serves for transmitting motion from the axle 19 to the gear pinion 27 for rotating the drum 22. Any form of clutch mechanism may be provided for releasing the driving connection between the axle 19 and the drum 22. For this purpose we prefer to employ the clutch illustrated in our pending application for patent Serial # 398,065, filed Oct. 18th, 1907. As here shown, however, the stub shaft 28 is made of sufficient length to permit of the gear pinion 27 and sprocket 31 being moved laterally thereon for disengaging the pinion 27 from the pinion 26.

A sectional hopper 32 is provided for the load. As shown this hopper is mounted directly upon the side sills 12 and 13 for sliding movement toward and away from the distributing drum 22. Preferably each section 33 of the hopper 32 is formed of sheet metal having its ends upturned as indicated at 34, 35, to provide sides for the hopper, and the several sections of the hopper are connected together for the purpose of making a flexible structure by uniting one of the marginal edges of each section along the floor line of the hopper with one of the marginal edges of the next adjacent section as by means of hinges 36, most clearly shown in Fig. 3 of the drawings.

Sprocket chains as 37, 38 each turning over sprocket wheels as 39, 40 mounted respectively adjacent the front and rear of the wagon are provided for connecting the front and rear edges of the hopper for longitudinally moving the hopper over the slideways provided therefor, as by the side sills 12, 13. In order that each section of the hopper, during the backward movement thereof, may be partially overturned as it reaches the rear end of the wagon body to more effectually present its load to the distributing drum 22, and may be subsequently moved out of the way when its load has been discharged, the sprocket wheels 40 adjacent the rear of the wagon are of such form that the sections 33 of the hopper may turn over them after the manner of the links of a sprocket chain. As shown the sprocket wheels 39 are each fixed upon a shaft 41 which extends entirely across the body of the wagon adjacent its forward end and is journaled in side sills 12 and 13. The sprocket wheels 40 are of polygonal form to receive the sections 33 of the hopper and each is loosely mounted upon a rod 42 which extends between the side sills 12, 13 of the wagon adjacent its rear end. Preferably the drum 22 has a hub 65 formed upon each of its ends whereby the ends of the body of the drum are each separated from the adjacent supporting bracket 23, 24, to provide a space as 66, 67 Fig. 1 to receive the upturned ends 34, 35 of the hopper sections 33 as each turns over the sprocket wheels 40. As shown, however, the rear most sections 68 of the hopper 32 is without upturned ends, this section being in effect a tail board which forms with the drum 22 a closure for the back of the hopper when the parts of the device are at rest.

For moving the hopper 33 to gradually deliver its load to the distributing drum 22 ratchet and pawl mechanism is preferably provided for rotating the shaft 41. As shown two ratchet wheels 43, and 44, having oppositely directed ratchet teeth, one of the wheels as 43 being provided for turning the shaft in that direction whereby the hopper 33 is advanced upon the distributing mechanism of the wagon and the other ratchet wheel 44 being provided for turning the shaft in the opposite direction for returning the hopper to its load receiving position, are mounted upon the shaft 41 adjacent one of its ends, this shaft being preferably continued beyond the side sill 13 at one side of the wagon for this purpose. A pawl arm 45 is pivotally mounted upon the side of the wagon as at 46 to swing in a vertical plane adjacent the ratchet wheels 43, 44. A crank 47 formed upon the spindle of the distributer drum 22 adjacent one of its ends provides a convenient means for swinging the pawl arm 45 and as shown this crank is connected to the pawl arm by a link 48. A plurality of pawls as 49, 50, 51 and 52 are carried by the pawl arm 45 for operating the ratchet wheels 43, 44. As shown two of these pawls are provided for engaging each of the ratchet wheels 43, 44, the two pawls for each wheel being connected to the pawl arm 45 at opposite sides of its pivotal support 46 in order that when in operation the ratchet wheel may receive an impulse from one of the pawls during the swinging of the pawl arm in each direction. In order that the return movement of the hopper 33 may be effected at a greater speed than the advance movement thereof the pawls 49, 50 provided for engaging the ratchet wheel 44 are secured to the pawl arm 45 at a greater distance from its pivotal support than are the pawl arms 51, 52, provided for engaging the ratchet wheel 43.

Automatic means are provided for alternately raising and lowering the two sets of pawls 49, 50, and 51, 52. To this end a pawl guard 53 preferably located between the ratchet wheels 43, 44, is mounted for a rocking movement upon the shaft 41. This pawl guard has two wings as 54, 55, one of the wings as 54 being provided for raising the set of pawls 49, 50 out of engagement with the ratchet wheel 44 when the guard 53 is turned to one position and the other wing as 55 being provided for raising the pawls 51, 52 out of engagement with the ratchet wheel 43 when the guard is turned to its opposite position. For automatically shifting the pawl guard 53 an arm 56 is pivotally mounted upon one of the side sills, as 13, to swing in a vertical plane, that part of the arm above its pivotal support being as shown, in the path of the forward edge 58 of the hopper 32 and that part of the arm below its pivotal support being in the path of the rear edge 59 of the hopper. The arm 56 is connected to the pawl guard 53 by a link 60, and for yieldingly maintaining the pawl guard in either of its adjusted positions and for moving it to that position after an initial movement has been imparted to it by the swinging of the arm 56 a spring 61 is provided. As shown this spring reacts against a stop 62 fixed in position upon one of the side sills 13 of the wagon and is coiled about an eye-bar 63 connected to the pawl 53 at 64 and having a sliding engagement with the stop 62, the arrangement being such that the point 64 of pivotal connection between the rod 63 and the pawl guard 53 crosses a line drawn between the pivotal support of the pawl guard and the support 62 for the outer end of the eye-bar, about midway of its extreme positions, whereby its effective action upon the pawl guard 53 is reversed.

In use the hopper 32 will be filled with fertilizer and the device then employed as an ordinary wagon for carrying its load to the ground to be treated. When this has been reached the pinion 27 will be shifted in position upon the stub shaft 28 to engage the pinion 26. Further movement of the wagon will then cause a rotation of the drum 22 and a backward movement of the hopper on the side sills 12, 13, this latter being effected by the action of the pawls 51, 52 upon the ratchet wheel 43, the pawls being moved by the swinging of the pawl arm 45 by the crank 47 formed upon the end of the drum 22. As each section 33 of the hopper reaches the rear of the wagon it turns over the sprocket wheels 40 to a position beneath the sills, the first part of this movement being a tilting of the section whereby its load is effectually presented to the distributer drum. During the passage of each section of the hopper over the sprockets 40, its upturned ends 34, 35 which constitute the side walls of the hopper pass through the spaces 66, 67, provided between the ends of the drum 22 and the supporting brackets 23, 24.

When the entire load has been discharged the rear edge 59 of the hopper contacts with the arm 56 to turn the pawl guard 53 whereby the pawls 51, 52 are raised out of engagement with the ratchet wheel 43 and the pawls 49, 50 are permitted to engage the ratchet wheel 44 for returning the hopper to its load receiving position. This having been effected the forward edge 58 of the hopper contacts with the arm 56 for again reversing the action of the pawls 49, 50, 51 and 52, and driving connection between the axle 19 and the operative parts of the device will then be released until a fresh load has been brought to the place to be treated, the release being accomplished in the form of construction illustrated by manually moving the gear 27 outwardly on the stub shaft 28 until it becomes disengaged from the pinion 26, though obviously any form of automatic clutch mechanism may be employed for this purpose. Preferably the forward end of the hopper 32 is closed by a front board 69 fitted into the hopper section 33 at that point.

We claim as our invention:—

1. In a fertilizer distributer in combination, a wheeled frame, a pair of sprocket wheels journaled in the frame, an endless belt turning over the sprocket wheels including a sectional hopper comprising a plurality of bottom boards flexibly connected edge to edge and having upturned ends forming sides for the hopper, and a distributing drum mounted in the frame adjacent one of the sprocket wheels, the arrangement being such that as a section of the belt turns over the sprocket the upturned ends of the section pass the ends of the drum.

2. In a fertilizer distributer in combination a wheeled frame, a pair of sprocket wheels journaled in the frame, an endless belt turning over the sprocket wheels including a sectional hopper comprising a plurality of bottom boards flexibly connected edge to edge and having upturned ends forming sides for the hopper, and a distributing drum mounted in the frame adjacent one of the sprocket wheels, the arrangement being such that as each section of the hopper turns over the sprocket it is tilted to present its load to the drum and its ends pass the ends of the drum.

3. In a fertilizer distributer in combination, a reciprocable load carrying member, a shaft for imparting movement to such member in either direction, a pair of ratchet wheels mounted on the shaft having oppositely directed ratchet teeth, a pawl coöperating with each of the ratchet wheels, an oscillatable pawl lifter operable upon the pawls in alternation and means for shifting the pawl lifter including a trip engageable by the load carrying member at the limit of its movement in each direction to release the pawl lifter from one of its extreme positions and a reversible spring acting on the pawl lifter to move it to the other extreme position when released by the trip.

JOHN C. POPE.
WILLIAM J. POPE.

Witnesses:
HARRY USILTON,
R. O. LEITCH.